United States Patent [19]

Bracco

[11] 4,081,568

[45] Mar. 28, 1978

[54] MILK CHOCOLATE MANUFACTURING

[75] Inventor: Umberto Bracco, La Tour-de-Peilz, Switzerland

[73] Assignee: Societe d'Assistance Technique pour Produits Nestle S.A., Lausanne, Switzerland

[21] Appl. No.: 663,716

[22] Filed: Mar. 4, 1976

[30] Foreign Application Priority Data

Mar. 5, 1975 Switzerland .......................... 2752/75

[51] Int. Cl.$^2$ ........................... A23G 1/00; A23C 9/00
[52] U.S. Cl. .................................... 426/584; 426/585; 426/588; 426/631; 426/660
[58] Field of Search ............... 426/584, 588, 631, 600, 426/459, 585, 658

[56] References Cited

U.S. PATENT DOCUMENTS

| | | | |
|---|---|---|---|
| 3,622,342 | 11/1971 | Rusoff | 426/660 |
| 3,702,252 | 11/1972 | Veltman et al. | 426/584 |
| 3,769,030 | 10/1973 | Kleinert | 426/660 |

OTHER PUBLICATIONS

Cook, Chocolate Production and Use, Magazines for Ind., New York, 1963, p. 149.
Cook, Chocolate Production and Use, Magazines for Ind. New York, 1963, pp. 146–147, 211–212.
Williams Chocolate and Confectionery, Leonard Hill, London, 1964, pp. 116–121.

*Primary Examiner*—Jeanette M. Hunter
*Attorney, Agent, or Firm*—Watson, Leavenworth, Kelton & Taggart

[57] ABSTRACT

A method of making a milk chocolate by preparing a mixture of milk, sugar and, if desired, cocoa, adjusting the pH-value of the mixture to a value of from 6.25 to 6.7, and drying to form a product which is subsequently processed into milk chocolate.

12 Claims, No Drawings

MILK CHOCOLATE MANUFACTURING

BACKGROUND OF THE INVENTION

1. Field of the Invention

This invention relates to a method of making a milk chocolate, more especially a milk chocolate with a very milky and slightly lipolysed character.

DESCRIPTION OF THE INVENTION

The production of a milk chocolate with these qualities normally begins with the preparation of a mixture of concentrated milk, sugar and, in general, cocoa, which is dried to form a powder known as "milk powder". Various ingredients, such as sugar, cocoa butter, lecithin, are then added to this milk powder and the mass obtained is processed into chocolate by well known technological operations. In order to show up the lipolysed character, the milk powder normally has to be matured by storage for a period of at least a few months so as to allow adequate enzymatic lipolysis to take place. On a commercial scale, this enzymatic lipolysis is difficult to control because it is governed by numerous factors, such as the triglyceride content of the milk powder, its moisture content, its pH, the nature of the lipases present, etc., all factors which are in turn governed by the place of production of the milk used, by seasonal variations, by the period of lactation, by the origin and degree of fermentation of the cocoa, etc. Accordingly, the lipolysed character of the chocolate obtained is not constant from one batch to another.

SUMMARY OF THE INVENTION

The present invention enables a chocolate with a more constant lipolysed character to be obtained as a result of more effective control of the enzymatic lipolysis process. The present invention provides a method of making a milk chocolate which comprises preparing a mixture of milk and sugar, adjusting the pH-value of the mixture to a value of from 6.25 to 6.7, and drying to form a product which is subsequently processed into milk chocolate.

DESCRIPTION OF THE PREFERRED EMBODIMENTS

In the most common cases, the mixture of milk and sugar also contains cocoa and the chocolate obtained is a milk chocolate in the traditional sense of the term. If this mixture does not contain cocoa, particular milk chocolates, normally known as white chocolates, are obtained.

The pH-value of this mixture is generally of the order of 5.9 to 6.15. According to the invention, it is adjusted to a value of from 6.25 to 6.7 and preferably to a value of from 6.3 to 6.6 by the addition of food-grade basic substances, such as phosphates or carbonates. The mixture thus treated is then dried and a product generally referred to as "milk powder" is obtained. Thus, one of the parameters which governs lipolysis is under control. In addition, lipolysis is accelerated to the point where there is no need for the milk powder thus treated to be stored. It has been found that lipolysis generally takes place up to an equilibrium corresponding to from 2.4% to 2.5% by weight of free fatty acids, based on total fats. Whereas this equilibrium is time-consuming and difficult to reach (several months) in an untreated milk powder, i.e. in a milk powder where the pH of the initial mixture has not been adjusted, it is quickly reached in a standardised milk powder, i.e. in a milk powder where the pH of the initial mixture has been adjusted to a value of from 6.25 to 6.7. One important consequence of an equilibrium reached as quickly as this is that the organoleptic deviations attributable to the non-reproducibility of the other parameters governing lipolysis are far less susceptible to amplification. The lipolysed character obtained is thus more constant.

The starting milk powder may be prepared by mixing milk, sugar and, optionally, finely ground and partially fat-extracted cocoa or cocoa paste, for example 20 to 30 parts by dry weight of milk, 55 to 60 parts of sugar and 15 to 18 parts of cocoa. In order to avoid having to eliminate too much water during drying of this mixture, it is preferred to use concentrated milk and, better still, directly concentrated sugared milk, e.g., sweetened condensed milk. It is also possible to use a milk powder and to dilute with water either a whole milk powder or a skimmed milk powder to which lactic fats for example are added. A food-grade basic substance, for example trisodium phosphate, is then added to this mixture, which preferably has a dry matter content of the order of 50 to 90%, until the required pH-value is obtained. The proportions of basic substance to be added are of the order of 0.2 to 1% by weight of the final mass. This mixture is then dried by any conventional method, for example on rolls, to form the standardised milk powder with a residual moisture content of normally from 2 to 5%.

In order to complete the recipe of the milk chocolate envisaged, fats, especially cocoa butter or lactic fats, lecithin and, if necessary, more sugar are then added to this powder, preferably following adjustment of its grain size, after which production of the milk chocolate is continued in the usual way. For example, the standardised milk powder is crushed to a particle fineness of the order of 15 to 20 μm, after which fats are added to the powder thus obtained in a quantity of from 10% to 30%, according to requirements, giving a plastic mass which is conched at temperatures of from 50° to 70° C. over periods ranging from 48 to 120 hours. This is followed by "tempering" (i.e. the conched mass is made to crystallise in its most stable form of crystallisation at a strictly controlled temperature) and moulding.

The method according to the invention is illustrated by the following Examples, in which the percentages and proportions are expressed in values by weight.

EXAMPLE 1

Finely ground and partially fat-extracted cocoa (25% of residual fats) and concentrated sugared milk with a dry matter content of 76%, of which 40% represents sugar, are mixed in a ratio of 1 part by weight of cocoa to 6.5 parts by weight of concentrated sugared milk. A viscous mass with a dry matter content of the order of 62% and with a pH of 6.02 is thus obtained. 0.5% by weight of trisodium phosphate is then dissolved in this mass with vigorous stirring. The pH-value is thereby adjusted to 6.35. The mass thus treated is then continuously dried on rolls kept at a temperature of from 105° to 110° C, and a standardised milk powder with a moisture content of 4% is obtained. This milk powder is size-reduced into fine particles with a diameter of from 15 to 20 μm, followed by the addition of 15% of cocoa butter and lecithin. The mixture obtained is conched in a longitudinal conch over a period of 72 hours at a temperature of 60° C. The conched mass is then tempered at 28° C in an automatic tempering machine and moulded into bars. After cooling, the bars of milk chocolate thus prepared are wrapped and stored for 1 week.

Bars of milk chocolate prepared in the same way as described above, but from different production batches, are tasted. All these chocolates have a clean milky and lipolysed flavour which remains substantially the same from one sample to another.

By way of comparison, corresponding samples prepared from milk powders of which the pH-value has not been adjusted to between 6.25 and 6.7, but which have been stored for 4 months in jute bags at temperatures ranging from 8° to 15° C, show considerable variations in flavour.

EXAMPLES 2 TO 5

The operations described in Example 1 are repeated with the difference that the starting mixtures are dried under a partial vacuum of from 10 to 15 mm Hg, rather than at atmospheric pressure, at a final drying temperature of the order of 90° to 95° C. The starting mixtures and the milk powders obtained have the following characteristics:

| STARTING MIXTURE | EXAMPLES | | | | |
|---|---|---|---|---|---|
| | 1 (recap) | 2 | 3 | 4 | 5 |
| Concentrated whole milk | X | | | | |
| Whole milk powder | | | | X | |
| Skimmed milk powder | | X | X | | X |
| Lactic fats | | | | | X |
| Partially fat-extracted cocoa | X | X | | | |
| Whole cocoa (cocoa paste) | | | X | | |
| Sugar | X | X | X | X | X |
| % of dry matter | 62 | 84 | 70 | 65 | 63 |
| pH after adjustment | 6.35 | 6.4 | 6.5 | 6.35 | 6.55 |
| MILK POWDERS | | | | | |
| % residual moisture | 4 | 4 | 3 | 3.5 | 3 |

The proportions of the various ingredients are of course selected to give the final compositions shown below.

The milk powders obtained are then crushed, followed by the addition of fats and lecithin and finally by treatment in the same way as described in Example 1. The chocolates thus prepared have the following characteristics:

| NATURE OF THE FATS ADDED TO THE MILK POWDER | EXAMPLES | | | | |
|---|---|---|---|---|---|
| | 1 (recap) | 2 | 3 | 4 | 5 |
| Cocoa butter | X | X | X | X | X |
| Lactic fats | | | | X | |
| COMPOSITION OF THE CHOCOLATES (in parts) | | | | | |
| Non-fat lactic solids | 21 | 22 | 22 | 20 | 20 |
| Lactic fats | 7 | 8 | 8 | 6 | 6 |
| Non-fat cocoa solids | 8 | 7 | 7 | — | — |
| Cocoa fats | 17 | 17 | 17 | 26 | 26 |
| Sugar | 47 | 46 | 47 | 48 | 48 |
| Lecithin | 0.2 | 0.2 | 0.2 | 0.1 | 0.3 |

The chocolates of Examples 2 and 3 are traditional milk chocolates, whilst the chocolates of Examples 4 and 5 are white chocolates.

I claim:
1. A method of making a milk powder product for use as an ingredient in the making of milk chocolate which comprises preparing a mixture of milk and sugar, adjusting the pH-value of the mixture to a value of from 6.25 to 6.7, and then drying the mixture to provide said product.
2. A method as claimed in claim 1, wherein the starting mixture of milk and sugar contains cocoa.
3. A method as claimed in claim 1, wherein the pH of the mixture is adjusted to a value of from 6.3 to 6.6.
4. A method as claimed in claim 2, wherein the pH of the mixture is adjusted to a value of from 6.3 to 6.6.
5. A method as claimed in claim 1, wherein the pH of the mixture is adjusted by the addition of a phosphate or a carbonate.
6. A method as claimed in claim 2, wherein the pH of the mixture is adjusted by the addition of a phosphate or a carbonate.
7. A method as claimed in claim 5, wherein the pH of the mixture is adjusted with trisodium phosphate.
8. A method as claimed in claim 6, wherein the pH of the mixture is adjusted with trisodium phosphate.
9. A milk chocolate when prepared by a method as claimed in claim 1.
10. A milk chocolate when prepared by a method as claimed in claim 2.
11. A method as claimed in claim 2, wherein fats and optionally sugar are added to the milk powder product to provide a milk chocolate mix, said mix thereafter being subjected to conching, tempering and molding operations to produce milk chocolate.
12. A method as claimed in claim 1, wherein fats and optionally sugar are added to the milk powder product to provide a milk chocolate mix, said mix thereafter being subjected to conching, tempering and molding operations to produce milk chocolate.

* * * * *